No. 779,106.

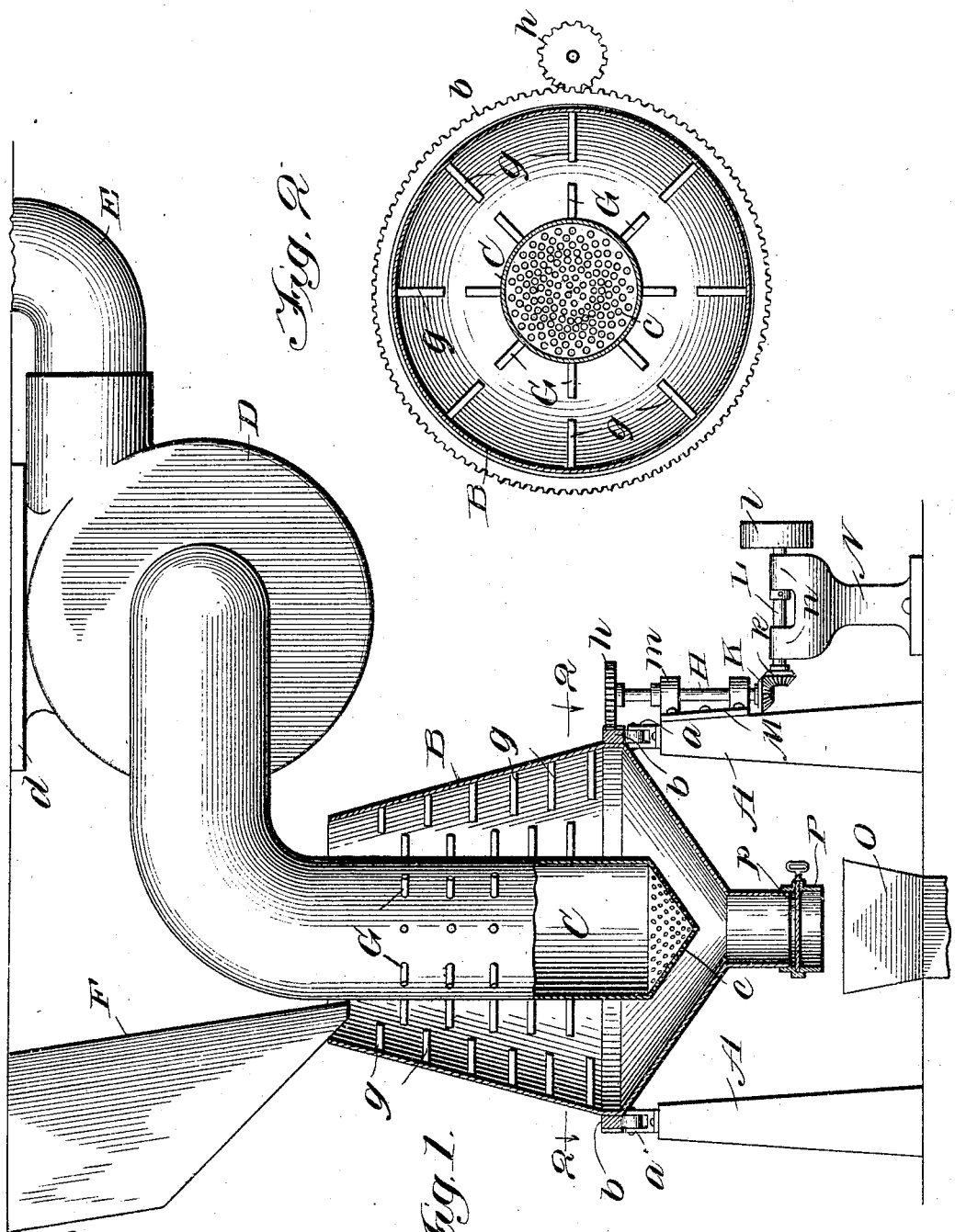

Patented January 3, 1905.

UNITED STATES PATENT OFFICE.

FREDERICK A. WEGNER AND JESSE D. BOURDEAU, OF DETROIT, MICHIGAN.

ROTARY DRIER.

SPECIFICATION forming part of Letters Patent No. 779,106, dated January 3, 1905.

Application filed May 11, 1903. Serial No. 156,644.

*To all whom it may concern:*

Be it known that we, FREDERICK A. WEGNER and JESSE D. BOURDEAU, citizens of the United States, residing at Detroit, county of Wayne, State of Michigan, have invented a certain new and useful Improvement in Rotary Driers; and we declare the following to be a full, clear, and exact description of the invention, such as will enable others skilled in the art to which it pertains to make and use the same, reference being had to the accompanying drawings, which form a part of this specification.

Our invention relates in general to cooling and drying apparatus, and more particularly to a rotary type of such apparatus especially designed for use in the preparation of flake and granular cereal food.

In manufacturing flake and granular food the cereal is subjected to a treatment comprising a series of steps by means of which the raw grain is converted into the prepared food. The grain after being soaked is cooked in a steamer and then cooled and dried before being rolled.

The primary object of our invention is to provide an apparatus for removing the moisture from and cooling the cereal in the manufacture of flake food after it has been cooked in the steamer preparatory to its being rolled.

A further object of our invention is to provide a cooling and drying apparatus for cereals in the process of manufacturing flake and granulated food which receives the cereal from the steamer and cools and dries it preparatory to its passing to the rollers or other apparatus for performing the next step in the process of treatment.

A still further object of our invention is to provide an apparatus of the character referred to which will be simple in construction, inexpensive in manufacture, and efficient in use.

The present embodiment of our invention, generally described, consists in a receptacle in which the material to be dried is deposited, mechanism located within the receptacle for agitating or stirring the material, means for relatively moving the stirring mechanism and the receptacle, and exhausting means communicating with the receptacle.

Our invention will be more fully described hereinafter with reference to the accompanying drawings, in which the same is illustrated as embodied in two convenient and practical forms, and in which—

Figure 1 is a vertical central section, parts being shown in elevation; and Fig. 2, a horizontal sectional view on line 2 2, Fig. 1.

Similar reference characters are used to designate similar parts in both figures of the drawings.

Referring more particularly to Figs. 1 and 2, A A indicate posts or standards, upon the tops of which are supported rollers *a a*. Resting upon the rollers *a a* is a ring *b*, provided with exterior vertical teeth. Surrounded and supported by the ring *b* is a receptacle B, having an open top.

The material to be cooled and dried is deposited in a receptacle B by any suitable means—such, for instance, as a chute F. When the material to be dried is a cereal in the process of conversion into flake and granular food, the chute F receives the cereal after it has been cooked in a steamer.

A conduit C extends downwardly within the receptacle B and is provided with a perforated lower end *c*, preferably conical in shape to conform to the conical bottom wall of the receptacle B. The upper end of the conduit C communicates with an exhausting mechanism—such, for instance, as a blower D. E indicates a conduit through which the air is expelled by the blower. The blower may be supported by any suitable means—such, for instance, as a plate *d*. The conduit C is immovably retained concentrically within the receptacle B through its connection with the stationary blower D.

The interior surface of the receptacle B is provided with a number of inwardly-projecting pins *g*, which coöperate with a number of pins G, supported by and projecting outwardly from the exterior surface of the conduit C.

Journaled in bearings m, carried by a plate M, supported on one of the standards A, is a vertical shaft H. A gear-wheel h is fixed to the upper end of the shaft H and meshes with the teeth on the ring b. The lower end of the shaft H is provided with a bevel-gear K, which meshes with a bevel-gear k, fixed to the end of a power-shaft L. The power-shaft L is journaled in any suitable bearings—such, for instance, as at n, supported at the upper end of a standard N. Any suitable power-communicating device—such, for instance, as a belt-pulley l—is provided for rotating the shaft L.

Concentrically depending from the bottom of the receptacle B is a chute P, provided with a gate p for controlling the passage therethrough of the material. Located below the chute P is a hopper O for receiving the material from the drier and delivering the same to any desired point—such, for instance, as rolls for crushing the material when the same is a cereal—in the process of manufacturing flake and granular food.

The operation of the embodiment of our invention shown in Figs. 1 and 2 is as follows: The material is delivered from the chute F into the receptacle B and surrounds the conduit C. The receptacle B is rotated by means of a belt or other power connection, which engages the pulley l. The exhausting mechanism draws the air through the perforated bottom c, and thereby removes the moisture from and cools the material contained in the receptacle. The movement of the pins g with respect to the pins G stirs the material within the receptacle, so that the particles thereof may be separated and thoroughly cooled and dried by the exhaust mechanism. The gate p may be adjusted to regulate the passage-way through the chute P, so that the material is retained within the receptacle B before its delivery to the hopper O a sufficient interval of time to insure its being cooled and dried to the desired degree.

From the foregoing description it will be observed that we have invented an improved rotary drying and cooling apparatus especially designed for use in the manufacture of flake or granular food from cereals which comprises a receptacle into which the cereal or other material is deposited, an exhausting mechanism communicating with the receptacle for drawing air through the material contained therein, agitating or stirring mechanism located within the receptacle, and means for relatively rotating the receptacle and the stirring mechanism.

While we have described more or less precisely the details of construction, we do not wish to be understood as limiting ourselves thereto, as we contemplate changes in form, the proportion of parts, and the substitution of equivalents as circumstances may suggest or render expedient without departing from the spirit of our invention.

Having now fully described our invention, what we claim as new, and desire to secure by Letters Patent, is—

1. In a drying and cooling apparatus, the combination with a receptacle in which the material is deposited, of a conduit extending within the receptacle, projections extending outwardly around said conduit, means for relatively rotating said receptacle and conduit, and exhaust mechanism communicating with said conduit.

2. In an apparatus for drying and cooling material, the combination with a receptacle in which the material to be dried and cooled is deposited, of projections extending within the receptacle, a conduit located within said receptacle, projections extending outwardly around said conduit, mechanism for relatively rotating said receptacle and the conduit, and exhaust mechanism communicating with said conduit.

3. In a drying and cooling apparatus, the combination with a receptacle in which the material is deposited, of projections extending within the receptacle, a conduit located within said receptacle, projections extending outwardly around said conduit, exhaust mechanism communicating with said conduit, and a perforated partition interposed between the material and the exhaust mechanism.

4. In an apparatus for drying and cooling material, the combination with a receptacle in which the material to be dried and cooled is deposited, of projections extending within the receptacle, a conduit located concentrically within said receptacle, projections extending outwardly around said conduit, mechanism for relatively rotating said receptacle and said conduit, exhaust mechanism communicating with said conduit, and a perforated partition interposed between the material and exhaust mechanism.

5. In a drying and cooling apparatus, the combination with a receptacle in which the material is deposited, of means for rotating said receptacle around a vertical axis, a stationary conduit extending downwardly within said receptacle and having perforations extending therethrough, radial projections extending outwardly around said conduit and inwardly from said receptacle, and exhaust mechanism communicating with said conduit.

6. In an apparatus for drying and cooling material, the combination with a receptacle in which the material to be dried and cooled is deposited, of means for rotating said receptacle around a vertical axis, a valve controlling a passage-way leading from the bottom of said receptacle, a stationary conduit extending concentrically within said receptacle, a perforated cap closing the lower end of said conduit, exhaust mechanism communicating with said conduit, and radial projections extending outwardly around said conduit and inwardly from the interior surface of said receptacle.

In testimony whereof we sign this specification in the presence of two witnesses.

FREDERICK A. WEGNER.
JESSE D. BOURDEAU.

Witnesses:
Z. K. GRAHAM,
RALPH L. ALDRICH.